US012737231B2

(12) United States Patent
Piednoel

(10) Patent No.: US 12,737,231 B2
(45) Date of Patent: Sep. 15, 2026

(54) OUT-OF-ORDER WORKLOAD EXECUTION

(71) Applicant: Mercedes-Benz Group AG, Stuttgart (DE)

(72) Inventor: Francois Piednoel, Sunnyvale, CA (US)

(73) Assignee: Mercedes-Benz Group AG, Stuttgart (DE)

( * ) Notice: Subject to any disclaimer, the term of this patent is extended or adjusted under 35 U.S.C. 154(b) by 449 days.

(21) Appl. No.: 18/195,662

(22) Filed: May 10, 2023

(65) Prior Publication Data

US 2024/0378090 A1 Nov. 14, 2024

(51) Int. Cl.

| | |
|---|---|
| ***G06F 9/46*** | (2006.01) |
| ***B60W 60/00*** | (2020.01) |
| ***G06F 9/50*** | (2006.01) |
| ***G06F 13/16*** | (2006.01) |

(52) U.S. Cl.

CPC ............ *G06F 9/505* (2013.01); *B60W 60/00* (2020.02); *G06F 13/1663* (2013.01); *B60W 2420/00* (2013.01); *G06F 2209/5022* (2013.01)

(58) Field of Classification Search

CPC ..... G06F 9/505; G06F 13/1663; B60W 60/00
USPC .......................................................... 718/105
See application file for complete search history.

(56) References Cited

U.S. PATENT DOCUMENTS

| | | | | |
|---|---|---|---|---|
| 8,103,754 | B1 | 1/2012 | Luong | |
| 10,992,257 | B2 | 4/2021 | Narla | |
| 11,386,013 | B2 | 7/2022 | Shetty | |
| 11,388,054 | B2 | 7/2022 | Bernat | |
| 11,410,266 | B2 | 8/2022 | Matam | |
| 11,565,606 | B2 | 1/2023 | Kazuno | |
| 11,573,856 | B1 | 2/2023 | Ditty | |
| 12,136,002 | B1 | 11/2024 | Piednoel | |
| 2008/0177964 | A1 | 7/2008 | Takahashi | |
| 2016/0098662 | A1 | 4/2016 | Voss et al. | |
| 2017/0109217 | A1* | 4/2017 | Raman | G06F 9/52 |

(Continued)

FOREIGN PATENT DOCUMENTS

| | | | |
|---|---|---|---|
| CN | 110879546 | A | 3/2020 |
| CN | 112149369 | A | 12/2020 |

(Continued)

OTHER PUBLICATIONS

Francois Piednoel, Snug Silicon Valley 2023 Keynote, The Standardization Imperative for Chiplets. Mar. 29-30, 2023, Santa Clara, CA. https://www.synopsys.com/community/resources/videos/snug-keynotes.html.

(Continued)

*Primary Examiner* — Diem K Cao
(74) *Attorney, Agent, or Firm* — Mahamedi IP Law LLP

(57) ABSTRACT

A computing system can include a sensor data input chiplet to (i) obtain sensor data from a sensor system, and (ii) store the sensor data in a cache. One or more workload processing chiplets can perform out-of-order execution on workloads corresponding to the sensor data stored in the cache, where respective workloads comprise sets of dependencies. The one or more workload processing chiplets perform out-of-order execution on the workloads by dynamically determining whether one or more dependencies exists for the respective workload, and when no data dependencies exist for the respective workload, executing the respective workload.

20 Claims, 4 Drawing Sheets

(56) References Cited

U.S. PATENT DOCUMENTS

| | | | | |
|---|---|---|---|---|
| 2018/0276040 | A1 | 9/2018 | Hosmani et al. | |
| 2019/0325580 | A1 | 10/2019 | Lukac | |
| 2019/0391855 | A1 | 12/2019 | Bernat | |
| 2020/0017114 | A1 | 1/2020 | Santoni et al. | |
| 2022/0051467 | A1 | 2/2022 | Woop | |
| 2022/0114028 | A1 | 4/2022 | Peng et al. | |
| 2022/0126864 | A1 | 4/2022 | Moustafa | |
| 2022/0206846 | A1 | 6/2022 | Windh | |
| 2022/0283971 | A1 | 9/2022 | Lee | |
| 2022/0342673 | A1 | 10/2022 | Wang | |
| 2022/0414455 | A1 | 12/2022 | Collins | |
| 2023/0032305 | A1 | 2/2023 | Krishnani | |
| 2023/0036117 | A1 | 2/2023 | Krishnani | |
| 2023/0063601 | A1 | 3/2023 | Upadhyay | |
| 2023/0068168 | A1 | 3/2023 | Estep | |
| 2023/0176577 | A1* | 6/2023 | Ditty .................... | G06V 20/588 701/23 |
| 2023/0185624 | A1 | 6/2023 | Yao | |
| 2023/0305993 | A1 | 9/2023 | Davis | |
| 2024/0166147 | A1 | 5/2024 | Carr | |
| 2024/0391477 | A1 | 11/2024 | Piednoel | |

FOREIGN PATENT DOCUMENTS

| | | | | |
|---|---|---|---|---|
| CN | 114780227 A | | 7/2022 | |
| CN | 115688093 A | | 2/2023 | |
| EP | 4120136 A1 | * | 1/2023 | ............. G06N 3/084 |
| GB | 2560708 | | 9/2018 | |
| KR | 20210015472 A | | 2/2021 | |

OTHER PUBLICATIONS

International Search Report with Written Opinion of the International Searching Authority for the Application No. PCT/EP2024/025154 mailed Jul. 31, 2024.

* cited by examiner

OUT-OF-ORDER WORKLOAD EXECUTION

BACKGROUND

Universal Chiplet Interconnect Express (UCIe) provides an open specification for an interconnect and serial bus between chiplets, which enables the production of large system-on-chip (SoC) packages with intermixed components from different silicon manufacturers. Autonomous vehicle computing systems may operate using chiplet arrangements that follow the UCIe specification. One goal of creating such computing systems is to achieve the robust safety integrity levels of other important electrical and electronic (E/E) automotive components of the vehicle.

SUMMARY

A computing system can include a sensor data input chiplet to obtain sensor data from a sensor system of a vehicle, and store the sensor data (e.g., image data, LIDAR data, radar data, ultrasonic data, etc.) in a cache memory. According to examples described herein, the sensor data input chiplet can generate an identifier for the sensor data (e.g., an identifier for each obtained image from various cameras of the vehicle's sensor system) and indicate an address of the sensor data in the cache memory. The identifier and address of the sensor data can be referenced in a reservation table that includes workload identifiers, dependency information for each workload, and addresses of the necessary data to execute a particular workload. The computing system can include a shared memory that includes the reservation table, which can be referenced by various chiplets of the computing system to perform out-of-order workload execution.

In various implementations, the computing system can comprise an SoC arrangement or a multiple-SoC arrangement, with each SoC comprising a plurality of chiplets. In certain aspects, the plurality of chiplets can include a sensor data input chiplet, a central chiplet, and a number of additional workload processing chiplets (e.g., machine learning (ML) accelerator chiplet, autonomous drive chiplets, high-bandwidth memory chiplets, general compute chiplets, and the like). In various examples, the shared memory can store a set of programs comprising instructions for processing the sensor data in order to perform workloads corresponding to autonomous driving tasks, such as scene understanding, object detection and classification, motion prediction, motion planning, and autonomous vehicle control tasks. According to examples described herein, the central chiplet and additional workload processing chiplets can perform out-of-order execution on the workloads corresponding to the set of autonomous driving tasks.

In particular, each workload can comprise a suite of instructions that have a set of dependencies indicated in workload entries of the reservation table. For example, an ML inference workload on two-dimensional image data of a surrounding environment of the vehicle can be dependent on the initial acquisition of two-dimensional images from each camera of the vehicle at a given time, and then stitching the images together to form the image ribbon of the surrounding environment of the vehicle. In prior implementations, an ML inference engine would perform ML inference on each image as they become available as opposed to acquiring all images first, stitching the images to generate the image ribbon, and then performing ML inference on the image ribbon.

In various examples, a chiplet executing workloads can continuously monitor the reservation table for available workload entries (e.g., workload identifiers, addresses, and dependency information), which can indicate whether a particular workload is ready for execution or whether one or more dependencies still exist for the workload. For example, a workload entry for a particular workload can include or be associated with other workload identifiers upon which the particular workload depends. The reservation table can comprise a workload window (e.g., an instruction window for multimedia data) in which a pointer can sequentially read through each workload entry to determine whether the particular workload has any unresolved dependencies. If so, the pointer progresses to the next entry without the workload being executed. However, if the workload indicates that all dependencies have been resolved (e.g., all workloads upon which the particular workload depends have been executed), then the chiplet(s) can execute the workload.

Accordingly, to facilitate out-of-order execution of workloads, the reservation table can comprise an out-of-order buffer that enables the chiplet to execute the workloads in an order governed by the availability of input data specific to the individual workload, as opposed to a natural order in which data becomes available (e.g., executing workloads that do not have dependencies in a non-deterministic manner). As such, the reservation table can comprise workload entries that include dependencies that have not been performed or otherwise resolved. The workload processing chiplet can monitor the reservation table for entries that indicate whether the necessary data is available for executing a particular workload.

In various implementations, out-of-order execution of workloads can increase speed, increase power efficiency, and decrease complexity in the overall execution of the workloads. In particular, the workload processing chiplets can continuously monitor and update the reservation table provided in the shared memory of the SoC arrangement to determine which workloads still have dependencies and which workloads are ready for execution, and to indicate which workloads have been completed by the chiplets.

In certain implementations, the central chiplet can execute scheduling logic that facilitates execution of the workloads in a set of workload pipelines that are independent of each other. For example, the chiplets can execute workloads in each pipeline in a deterministic manner, such that successive workloads of the pipeline are dependent on the outputs of preceding workloads in the pipeline. A central chiplet can include the shared memory housing the reservation table, which is monitored and updated by one or more processors of the central chiplet and the additional workload processing chiplets for performing out-of-order execution of the workloads. Accordingly, the computing system can execute multiple independent workload pipelines in parallel, with each workload pipeline including a plurality of workloads to be executed in a deterministic manner. Each workload pipeline can provide sequential outputs (e.g., for other workload pipelines or for processing by an application program for autonomously operating the vehicle) that can contribute to the overall autonomous operation of the vehicle.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
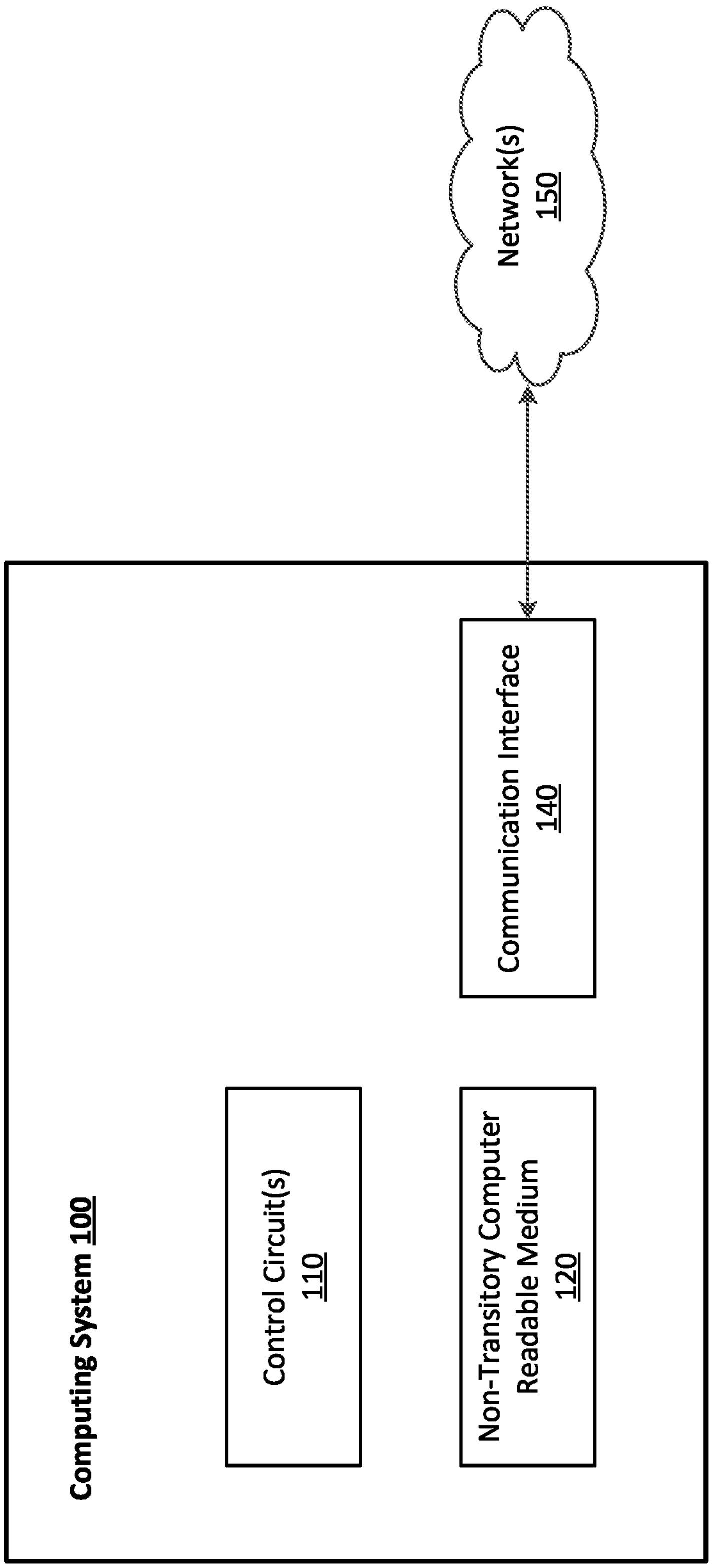
FIG. 1 is a block diagram depicting an example computing system in which embodiments described herein may be implemented, in accordance with examples described herein.

In certain autonomous vehicle implementations, the vehicle computing system processes sensor data (e.g., images, LIDAR data, etc.) as the data becomes available in real time. In other words, these autonomous vehicle implementations perform the various perception, object detection and classification, scene understanding, motion prediction, and/or ML inference tasks on sensor data in a non-deterministic manner. For example, an on-board computing system implementing a neural network for performing ML inference on two-dimensional image data will do so on each image sequentially as they are generated by the vehicle's cameras.

In accordance with examples described herein, a computing system can execute workloads for autonomous driving tasks using dynamic scheduling of individual workloads using a reservation table implemented in a shared memory of the computing system. In various aspects, the computing system can comprise an SoC or multiple-SoC arrangement, with each SoC comprising multiple chiplets for performing the autonomous driving tasks. The SoC can include a central chiplet comprising the shared memory and reservation table where information corresponding to workloads (e.g., workload entries) are inputted. The SoC can include a sensor data input chiplet that obtains sensor data from the vehicle sensor system, which can include any combination of cameras, LIDAR sensors, radar sensors, ultrasonic sensors, proximity sensors, and the like.

Upon obtaining each item of sensor data (e.g., individual images, point clouds, radar pulses, etc.), the sensor data input chiplet can indicate availability of the sensor data in the reservation table, store the sensor data in a cache, and indicate the address of the sensor data in the cache. Through execution of workloads in accordance with a set of independent pipelines, a set of workload processing chiplets can monitor the reservation table for available workloads. As provided herein, the initial raw sensor data can be referenced in the reservation table and processed through execution by an initial set of workloads by the workload processing chiplets. As an example, this initial processing can comprise stitching images to create a 360 degrees sensor view of the vehicle's surrounding environment.

When workloads are completed by the chiplets, dependency information for additional workloads in the reservation table can be updated to indicate so, and the additional workloads can become available for execution in the reservation table when no dependencies exist. In certain examples, the chiplets can monitor the reservation table by way of a workload window and instruction pointer arrangement, in which each entry of the reservation table is sequentially analyzed along the workload window by the workload processing chiplets. If a particular workload is ready for execution (e.g., all dependencies are resolved), the workload processing chiplets can execute the workload accordingly.

As such, the reservation table is implemented as an out-of-order buffer where workloads are held until all dependencies (e.g., other workloads) are resolved. Accordingly, the chiplets can perform out-of-order execution on workloads that correspond to the sensor data stored in the cache in a set of independent pipelines that may be certified based on their deterministic nature.

In experimentation and controlled testing environments, system redundancies and automotive safety integrity level (ASIL) ratings for autonomy systems are not typically a priority consideration. As autonomous driving features continue to advance (e.g., beyond Level 3 autonomy), and autonomous vehicles begin operating more commonly on public road networks, the qualification and certification of E/E components related to autonomous operation of the vehicle will be advantageous to ensure operational safety of these vehicles. Furthermore, novel methods for qualifying and certifying hardware, software, and/or hardware/software combinations will also be advantageous in increasing public confidence and assurance that autonomous driving systems are safe beyond current standards. For example, certain safety standards for autonomous driving systems include safety thresholds that correspond to average human abilities and care. Yet, these statistics include vehicle incidences involving impaired or distracted drivers and do not factor in specified time windows in which vehicle operations are inherently riskier (e.g., inclement weather conditions, late night driving, winding mountain roads, etc.).

Automotive safety integrity level (ASIL) is a risk classification scheme defined by ISO 26262 (the functional safety for road vehicles standard), and is typically established for the E/E components of the vehicle by performing a risk analysis of potential hazards, which involves determining respective levels of severity (i.e., the severity of injuries the hazard can be expected to cause; classified between S0 (no injuries) and S3 (life-threatening injuries)), exposure (i.e., the relative expected frequency of the operational conditions in which the injury can occur; classified between E0 (incredibly unlikely) and E4 (high probability of injury under most operating conditions)), and controllability (i.e., the relative likelihood that the driver can act to prevent the injury; classified between C0 (controllable in general) and C3 difficult to control or uncontrollable)) of the vehicle operating scenario. As such, the safety goal(s) for any potential hazard event includes a set of ASIL requirements.

Hazards that are identified as quality management (QM) do not dictate any safety requirements. As an illustration, these QM hazards may be any combination of low probability of exposure to the hazard, low level of severity of potential injuries resulting from the hazard, and a high level of controllability by the driver in avoiding the hazard and/or preventing injuries. Other hazard events are classified as ASIL-A, ASIL-B, ASIL-C, or ASIL-D depending on the various levels of severity, exposure, and controllability corresponding to the potential hazard. ASIL-D events correspond to the highest integrity requirements (ASIL requirements) on the safety system or E/E components of the safety system, and ASIL-A comprises the lowest integrity requirements. As an example, the airbags, anti-lock brakes, and power steering system of a vehicle will typically have an ASIL-D grade, where the risks associated with the failure of these components (e.g., the probable severity of injury and lack of vehicle controllability to prevent those injuries) are relatively high.

As provided herein, the ASIL may refer to both risk and risk-dependent requirements, where the various combinations of severity, exposure, and controllability are quantified to form an expression of risk (e.g., an airbag system of a vehicle may have a relatively low exposure classification, but high values for severity and controllability). As provided above, the quantities for severity, exposure, and controllability for a given hazard are traditionally determined using values for severity (e.g., S0 through S3), exposure (e.g., E0 through E4), and controllability (e.g., C0 through C3) in the ISO 26262 series, where these values are then utilized to classify the ASIL requirements for the components of a particular safety system. As provided herein, certain safety systems can perform variable mitigation measures, which can range from alerts (e.g., visual, auditory, or haptic alerts), minor interventions (e.g., brake assist or steer assist), major interventions and/or avoidance maneuvering (e.g., taking over control of one or more control mechanisms, such as the steering, acceleration, or braking systems), and full autonomous control of the vehicle.

Current fully autonomous driving systems can comprise non-deterministic inference models, in which the system executes one or more perception, object detection, object classification, motion prediction, motion planning, and vehicle control techniques based on, for example, two-dimensional image data, to perform all autonomous driving tasks. It is contemplated that such implementations may be difficult or impossible to certify and provide an ASIL rating for the overall autonomous driving system. To address these shortcomings in current implementations, an autonomous driving system is provided herein that may perform deterministic, reflexive inference operations on specified hardware arrangements that allow for the certification and ASIL grading of various components, software aspects of the system, and/or the entire autonomous driving system itself.

In certain implementations, the computing system can perform one or more functions described herein using a learning-based approach, such as by executing an artificial neural network (e.g., a recurrent neural network, convolutional neural network, etc.) or one or more machine-learning models. Such learning-based approaches can further correspond to the computing system storing or including one or more machine-learned models. In an embodiment, the machine-learned models may include an unsupervised learning model. In an embodiment, the machine-learned models may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

As provided herein, a "network" or "one or more networks" can comprise any type of network or combination of networks that allows for communication between devices. In an embodiment, the network may include one or more of a local area network, wide area network, the Internet, secure network, cellular network, mesh network, peer-to-peer communication link or some combination thereof and may include any number of wired or wireless links. Communication over the network(s) may be accomplished, for instance, via a network interface using any type of protocol, protection scheme, encoding, format, packaging, etc.

One or more examples described herein provide that methods, techniques, and actions performed by a computing device are performed programmatically, or as a computer implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers and/or personal computers using network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on personal computers or servers. Other examples of computer storage mediums include portable storage units, such as flash memory or magnetic memory. Computers, terminals, network-enabled devices are all examples of machines and devices that utilize processors, memory, and instructions stored on computer-readable mediums. Additionally, examples may be implemented in the form of computer programs, or a computer usable carrier medium capable of carrying such a program.

Example Computing System

FIG. 1 is a block diagram depicting an example computing system 100 in which embodiments described herein may be implemented, in accordance with examples described herein. In an embodiment, the computing system 100 can include one or more control circuits 110 that may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), systems on chip (SoCs), or any other control circuit. In some implementations, the control circuit(s) 110 and/or computing system 100 may be part of, or may form, a vehicle control unit (also referred to as a vehicle controller) that is embedded or otherwise disposed in a vehicle (e.g., a Mercedes-Benz® car, truck, or van). For example, the vehicle controller may be or may include an infotainment system controller (e.g., an infotainment head-unit), a telematics control unit (TCU), an electronic control unit (ECU), a central powertrain controller (CPC), a central exterior & interior controller (CEIC), a zone controller, an autonomous vehicle control system, or any other controller (the term "or" is used herein interchangeably with "and/or").

In an embodiment, the control circuit(s) 110 may be programmed by one or more computer-readable or computer-executable instructions stored on the non-transitory computer-readable medium 120. The non-transitory computer-readable medium 120 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 120 may form, for example, a computer diskette, a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 120 may store computer-executable instructions or computer-readable instructions, such as instructions to perform the below methods described in connection with FIG. 4.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 110 to perform one or more functional tasks. The modules and computer-readable/executable instructions may be described as performing various operations or tasks when the control circuit (s) 110 or other hardware components execute the modules or computer-readable instructions.

In further embodiments, the computing system 100 can include a communication interface 140 that enables communications over one or more networks 150 to transmit and receive data. In various examples, the computing system 100 can communicate, over the one or more networks 150, with fleet vehicles using the communication interface 140 to receive sensor data and implement the intersection classification methods described throughout the present disclosure. In certain embodiments, the communication interface 140 may be used to communicate with one or more other systems. The communication interface 140 may include any circuits, components, software, etc. for communicating via one or more networks 150 (e.g., a local area network, wide area network, the Internet, secure network, cellular network, mesh network, and/or peer-to-peer communication link). In some implementations, the communication interface 140 may include for example, one or more of a communications controller, receiver, transceiver, transmitter, port, conductors, software and/or hardware for communicating data/information.

As an example embodiment, the control circuit(s) 110 of the computing system 100 can include a SoC arrangement that facilitates the various methods and techniques described throughout the present disclosure. In various examples, the SoC can include a set of chiplets, including a central chiplet comprising a shared memory in which a reservation table is utilized to execute various autonomous driving workloads in an out-of-order manner, as described herein.

Example System-On-Chip

Figure 2:
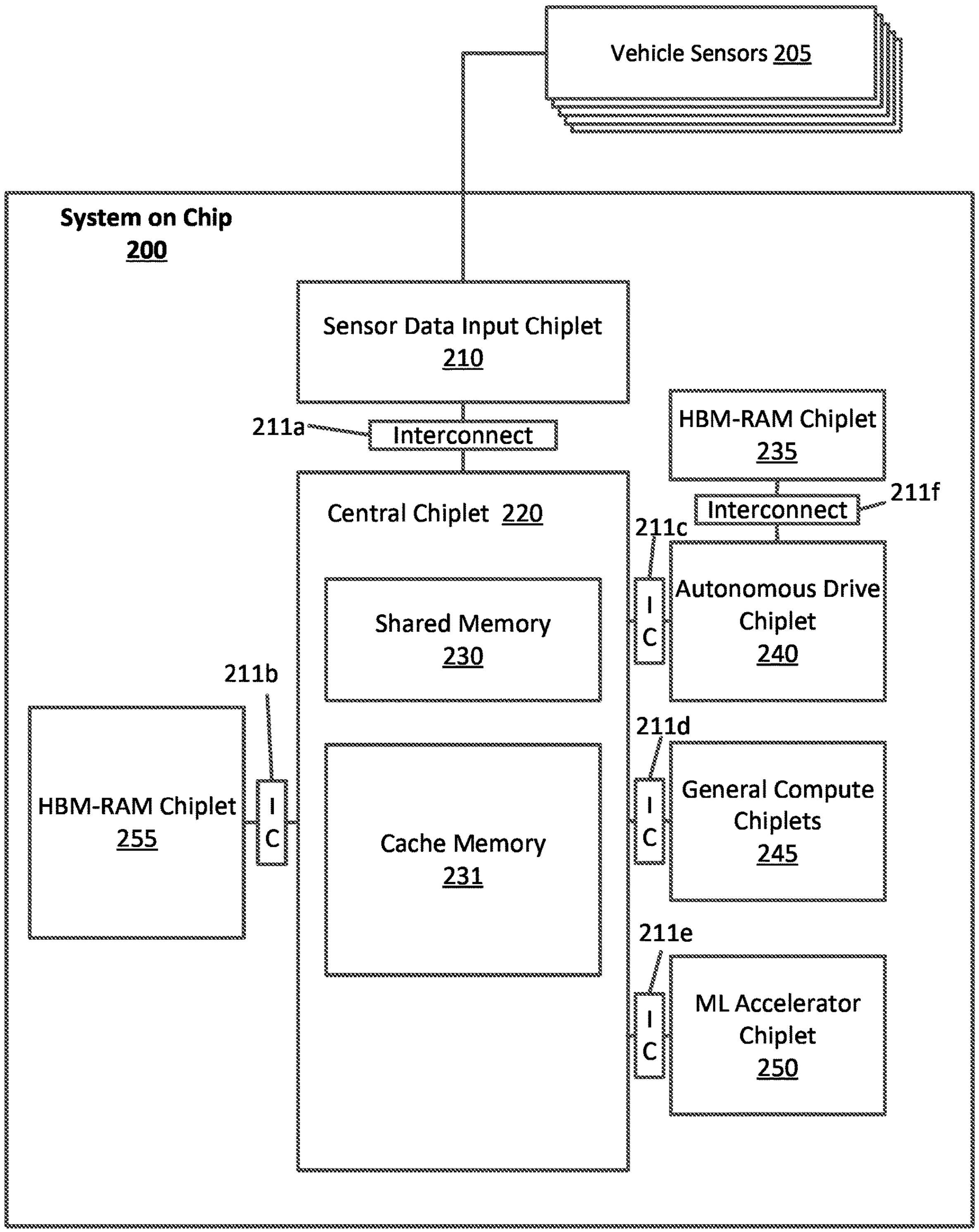
FIG. 2 is a block diagram depicting a system-on-chip (SoC) in which examples described herein may be implemented, in accordance with examples described herein.

FIG. 2 is a block diagram illustrating an example SoC 200, in accordance with examples described herein. The example SoC 200 shown in FIG. 2 can include additional components, and the components of system on chip 200 may be arranged in various alternative configurations other than the example shown. Thus, the system on chip 200 of FIG. 2 is described herein as an example arrangement for illustrative purposes and is not intended to limit the scope of the present disclosure in any manner.

Referring to FIG. 2, a sensor data input chiplet 210 of the system on chip 200 can receive sensor data from various vehicle sensors 205 of the vehicle. These vehicle sensors 205 can include any combination of image sensors (e.g., single cameras, binocular cameras, fisheye lens cameras, etc.), LIDAR sensors, radar sensors, ultrasonic sensors, proximity sensors, and the like. The sensor data input chiplet 210 can automatically dump the received sensor data as it's received into a cache memory 231 of the central chiplet 220. The sensor data input chiplet 210 can also include an image signal processor (ISP) responsible for capturing, processing, and enhancing images taken from the various vehicle sensors 205. The ISP takes the raw image data and performs a series of complex image processing operations, such as color, contrast, and brightness correction, noise reduction, and image enhancement, to create a higher-quality image that is ready for further processing or analysis by the other chiplets of the SoC 200. The ISP may also include features such as auto-focus, image stabilization, and advanced scene recognition to further enhance the quality of the captured images. The ISP can then store the higher-quality images in the cache memory 231.

In some aspects, the sensor data input chiplet 210 publishes identifying information for each item of sensor data (e.g., images, point cloud maps, etc.) to a shared memory 230 of a central chiplet 220, which acts as a central mailbox for synchronizing workloads for the various chiplets. The identifying information can include details such as an address in the cache memory 231 where the data is stored, the type of sensor data, which sensor captured the data, and a timestamp of when the data was captured.

To communicate with the central chiplet 220, the sensor data input chiplet 210 transmits data through an interconnect 211*a*. Interconnects 211*a-f* each represent die-to-die (D2D) interfaces between the chiplets of the SoC 200. In some aspects, the interconnects include a high-bandwidth data path used for general data purposes to the cache memory 231 and a high-reliability data path to transmit functional safety and scheduler information to the shared memory 230. Depending on bandwidth requirements, an interconnect may include more than one die-to-die interface. For example, interconnect 211*a* can include two interfaces to support higher bandwidth communications between the sensor data input chiplet 210 and the central chiplet 220.

In one aspect, the interconnects 211*a-f* implement the Universal Chiplet Interconnect Express (UCIe) standard and communicate through an indirect mode to allow each of the chiplet host processors to access remote memory as if it were local memory. This is achieved by using a specialized Network on Chip (NoC) Network Interface Unit (NIU)

(allows freedom of interferences between devices connected to the network) that provides hardware-level support for remote direct memory access (RDMA) operations. In UCIe indirect mode, the host processor sends requests to the NIU, which then accesses the remote memory and returns the data to the host processor. This approach allows for efficient and low-latency access to remote memory, which can be particularly useful in distributed computing and data-intensive applications. Additionally, UCIe indirect mode provides a high degree of flexibility, as it can be used with a wide range of different network topologies and protocols.

In various examples, the system on chip 200 can include additional chiplets that can store, alter, or otherwise process the sensor data cached by the sensor data input chiplet 210. The system on chip 200 can include an autonomous drive chiplet 240 that can perform the perception, sensor fusion, trajectory prediction, and/or other autonomous driving algorithms of the autonomous vehicle. The autonomous drive chiplet 240 can be connected to a dedicated HBM-RAM chiplet 235 in which the autonomous drive chiplet 240 can publish all status information, variables, statistical information, and/or processed sensor data as processed by the autonomous drive chiplet 240.

In various examples, the system on chip 200 can further include a machine-learning (ML) accelerator chiplet 240 that is specialized for accelerating AI workloads, such as image inferences or other sensor inferences using machine learning, in order to achieve high performance and low power consumption for these workloads. The ML accelerator chiplet 240 can include an engine designed to efficiently process graph-based data structures, which are commonly used in AI workloads, and a highly parallel processor, allowing for efficient processing of large volumes of data. The ML accelerator chiplet 240 can also include specialized hardware accelerators for common AI operations such as matrix multiplication and convolution as well as a memory hierarchy designed to optimize memory access for AI workloads, which often have complex memory access patterns.

The general compute chiplets 245 can provide general purpose computing for the system on chip 200. For example, the general compute chiplets 245 can comprise high-powered central processing units and/or graphical processing units that can support the computing tasks of the central chiplet 220, autonomous drive chiplet 240, and/or the ML accelerator chiplet 250.

In various implementations, the shared memory 230 can store programs and instructions for performing autonomous driving tasks. The shared memory 230 of the central chiplet 220 can further include a reservation table that provides the various chiplets with the information needed (e.g., sensor data items and their locations in memory) for performing their individual tasks. Further description of the shared memory 230 in the context of the dual SoC arrangements described herein is provided below with respect to FIG. 4. The central chiplet 220 also includes the large cache memory 231, which supports invalidate and flush operations for stored data.

Cache miss and evictions from the cache memory 231 are sent by a high-bandwidth memory (HBM) RAM chiplet 255 connected to the central chiplet 220. The HBM-RAM chiplet 255 can include status information, variables, statistical information, and/or sensor data for all other chiplets. In certain examples, the information stored in the HBM-RAM chiplet 255 can be stored for a predetermined period of time (e.g., ten seconds) before deleting or otherwise flushing the data. For example, when a fault occurs on the autonomous vehicle, the information stored in the HBM-RAM chiplet 255 can include all information necessary to diagnose and resolve the fault. Cache memory 231 keeps fresh data available with low latency and less power required compared to accessing data from the HBM-RAM chiplet 255.

As provided herein, the shared memory 230 can house a mailbox architecture in which a reflex program comprising a suite of instructions is used to execute workloads by the central chiplet 220, general compute chiplets 245, and/or autonomous drive chiplet 240. In certain examples, the central chiplet 220 can further execute a functional safety (FuSa) program that operates to compare and verify outputs of respective pipelines to ensure consistency in the ML inference operations. In further examples, the central chiplet 220 can execute a thermal management program to ensure that the various components of the SoC 200 operates within normal temperature ranges. Further description of the shared memory 230 in the context of out-of-order workload execution is provided below with respect to FIG. 3.

Out-of-Order Workload Execution

Figure 3:
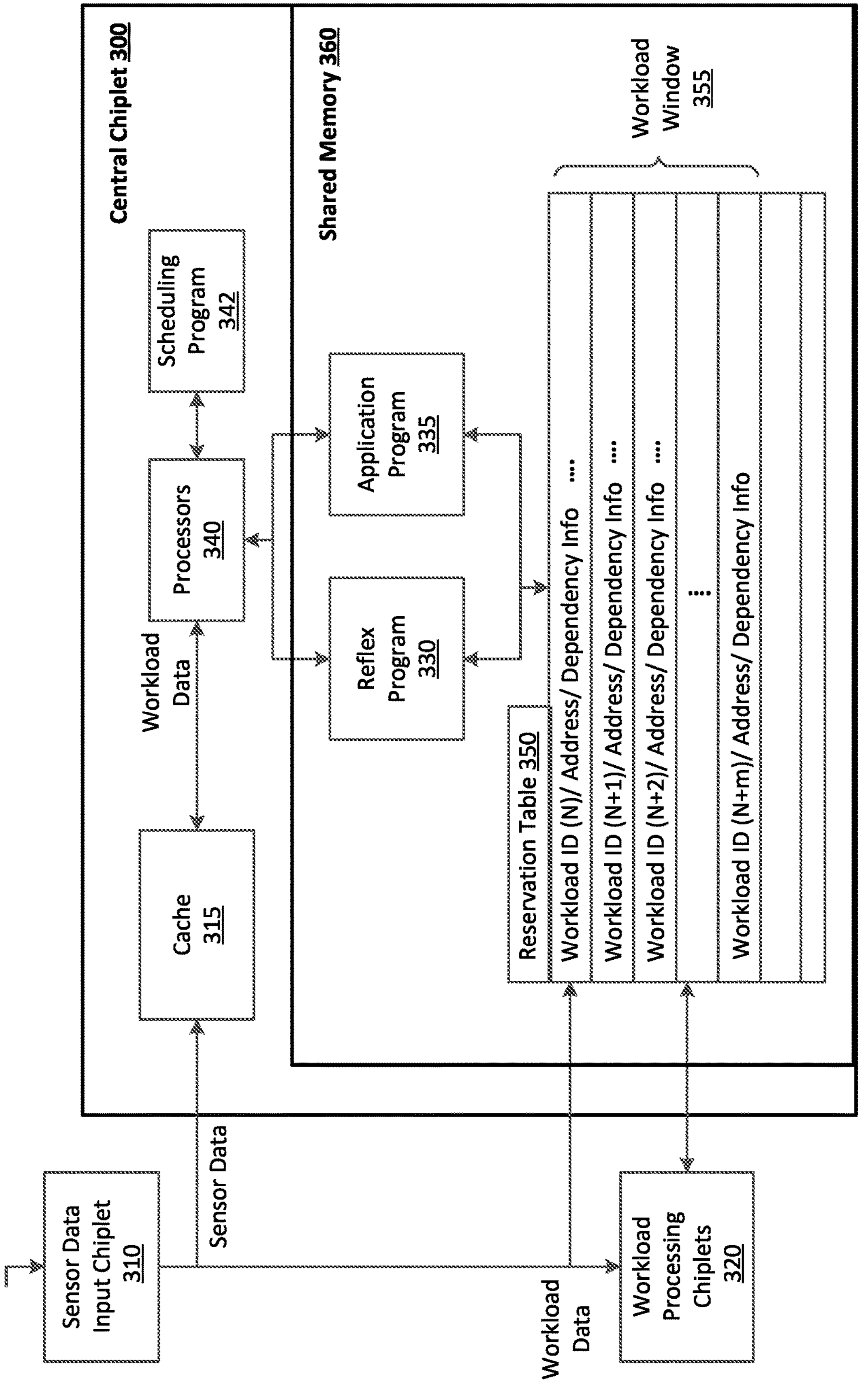
FIG. 3 is a block diagram illustrating an example central chiplet of an SoC arrangement for implementing out-of-order workload execution, in accordance with examples described herein.

FIG. 3 is a block diagram illustrating an example central chiplet 300 of an SoC arrangement for implementing out-of-order workload execution, in accordance with examples described herein. The central chiplet 300 shown in FIG. 3 can correspond to the central chiplet 220 of the SoC 200 as shown in FIG. 2. Furthermore, the sensor data input chiplet 310 of FIG. 3 can correspond to the sensor data input chiplet 210 shown in FIG. 2, and the workload processing chiplets 320 shown in FIG. 3, can correspond to the general compute chiplets 245, ML accelerator chiplet 250, and/or the autonomous drive chiplet 240 shown in FIG. 2.

Referring to FIG. 3, the central chiplet 300 can include a shared memory 360 storing a reflex program 330 and an application program 335. As provided herein, the reflex program 330 can comprise a set of instructions for executing reflex workloads in independent pipelines. The reflex workloads can comprise sensor data acquisition, sensor fusion, and inference tasks that facilitate scene understanding of the surrounding environment of the vehicle. These tasks can comprise two-dimensional image processing, sensor fused data processing (e.g., three-dimensional LIDAR, radar, and image fusion data), neural radiance field (NeRF) scene reconstruction, occupancy grid determination, object detection and classification, motion prediction, and other scene understanding tasks for autonomous vehicle operation.

As further provided herein, the application program 335 can comprise a set of instructions for operating the vehicle controls of the autonomous vehicle based on the outputs of the reflex workload pipelines. For example, the application program 335 can be executed by one or more processors 340 of the central chiplet 300 and/or one or more of the workload processing chiplets 320 (e.g., the autonomous drive chiplet 240 of FIG. 2) to dynamically generate a motion plan for the vehicle based on the execution of the reflex workloads, and operate the vehicle's controls (e.g., acceleration, braking, steering, and signaling systems) to execute the motion plan accordingly.

In various implementations, the central chiplet 300 can include a set of one or more processors 340 (e.g., a transient-resistant core) that can execute scheduling program 342 for out-of-order execution of workloads. In certain examples, one or more of the processors 340 can execute reflex workloads in accordance with the reflex program 330 and/or application workloads in accordance with the application program 335. As such, the processors 340 of the central chiplet 300 can reference, monitor, and update dependency information in workload entries of the reservation table 350 as workloads become available and are executed accordingly. For example, when a workload is executed by a particular chiplet, the chiplet updates the dependency information of other workloads in the reservation table 350 to indicate that the workload has been completed. This can include changing a bitwise operator or binary value representing the workload (e.g., from 0 to 1) to indicate in the reservation table 350 that the workload has been completed. Accordingly, the dependency information for all workloads having dependency on the completed workload is updated accordingly.

According to examples described herein, the reservation table 350 can include workload entries, each of which indicates a workload identifier that describes the workload to be performed, an address in the cache memory 315 and/or HBM-RAM of the location of raw or processed sensor data required for executing the workload, and any dependency information corresponding to dependencies that need to be resolved prior to executing the workload. In certain aspects, the dependencies can correspond to other workloads that need to be executed. Once the dependencies for a particular workload are resolved, the workload entry can be updated (e.g., by the chiplet executing the dependent workloads, or by the processors 340 of the central chiplet 300 through execution of the scheduling program 342). When no dependencies exist for a particular workload as referenced in the reservation table 350, the workload can be executed in a respective pipeline by a corresponding workload processing chiplet 320.

In various implementations, the sensor data input chiplet 310 obtains sensor data from the sensor system of the vehicle, and stores the sensor data (e.g., image data, LIDAR data, radar data, ultrasonic data, etc.) in a cache 315 of the central chiplet 300. The sensor data input chiplet 310 can generate workload entries for the reservation table 350 comprising identifiers for the sensor data (e.g., an identifier for each obtained image from various cameras of the vehicle's sensor system) and provide an address of the sensor data in the cache memory 315. An initial set of workloads be executed on the raw sensor data by the processors 340 of the central chiplet 300 and/or workload processing chiplets 320, which can update the reservation table 350 to indicate that the initial set of workloads have been completed.

As described herein, the workload processing chiplets 320 monitor the reservation table 350 to determine whether particular workloads in their respective pipelines are ready for execution. As an example, the workload processing chiplets 320 can continuously monitor the reservation table using a workload window 355 (e.g., an instruction window for multimedia data) in which a pointer can sequentially read through each workload entry to determine whether the workloads have any unresolved dependencies. If one or more dependencies still exist in the workload entry, the pointer progresses to the next entry without the workload being executed. However, if the workload indicates that all dependencies have been resolved (e.g., all workloads upon which the particular workload depends have been executed), then the relevant workload processing chiplet 320 and/or processors 340 of the central chiplet 300 can execute the workload accordingly.

As such, the workloads are executed in an out-of-order manner where certain workloads are buffered until their dependencies are resolved. Accordingly, to facilitate out-of-order execution of workloads, the reservation table 350 comprises an out-of-order buffer that enables the workload processing chiplets 320 to execute the workloads in an order governed by the resolution of their dependencies. It is contemplated that out-of-order execution of workloads in the manner described herein can increase speed, increase power efficiency, and decrease complexity in the overall execution of the workloads.

As described herein, the workload processing chiplets 320 can execute workloads in each pipeline in a deterministic manner, such that successive workloads of the pipeline are dependent on the outputs of preceding workloads in the pipeline. In various implementations, the processors 340 and workload processing chiplets 320 can execute multiple independent workload pipelines in parallel, with each workload pipeline including a plurality of workloads to be executed in a deterministic manner. Each workload pipeline can provide sequential outputs (e.g., for other workload pipelines or for processing by the application program 335 for autonomously operating the vehicle). Through concurrent execution of the workloads in deterministic pipelines, the application program 335 can autonomously operate the controls of the vehicle along a travel route.

As an illustration, the scheduling program 342 can cause the processors 340 and workload processing chiplets 320 to perform out-of-order execution on the workloads in independent pipelines. In previous implementations, each image generated by the camera system of the vehicle would be processed or inferred on as the image becomes available. The instruction set would involve acquiring the image, scheduling inference on the image by a workload processing chiplet, performing inference on the image, acquiring a second image, scheduling inference on the second image by the workload processing chiplet, and performing inference on the second image, and so on across the suite of cameras of the vehicle. By reorganizing the order in which workloads are processed, the complexity of computation is significantly reduced. Specifically, for validating an autonomous driving system that utilizes out-of-order workload execution as described herein, the number of computational combinations for verification (e.g., by a safety authority) is significantly reduced.

As provided herein, the use of the workload window 355 and reservation table 350 referencing dependency information for workloads enables the workload processing chiplets 320 to operate more efficiently by performing out-of-order execution on the workloads. Instead of performing inference on images based on when they are available, a workload processing chiplet 320 can acquire all images from all cameras first, and then perform inference on all the images together. Accordingly, the workload processing chiplet 320 executes its workloads with significantly reduced complexity, increased speed, and reduced power requirements.

Methodology

Figure 4:
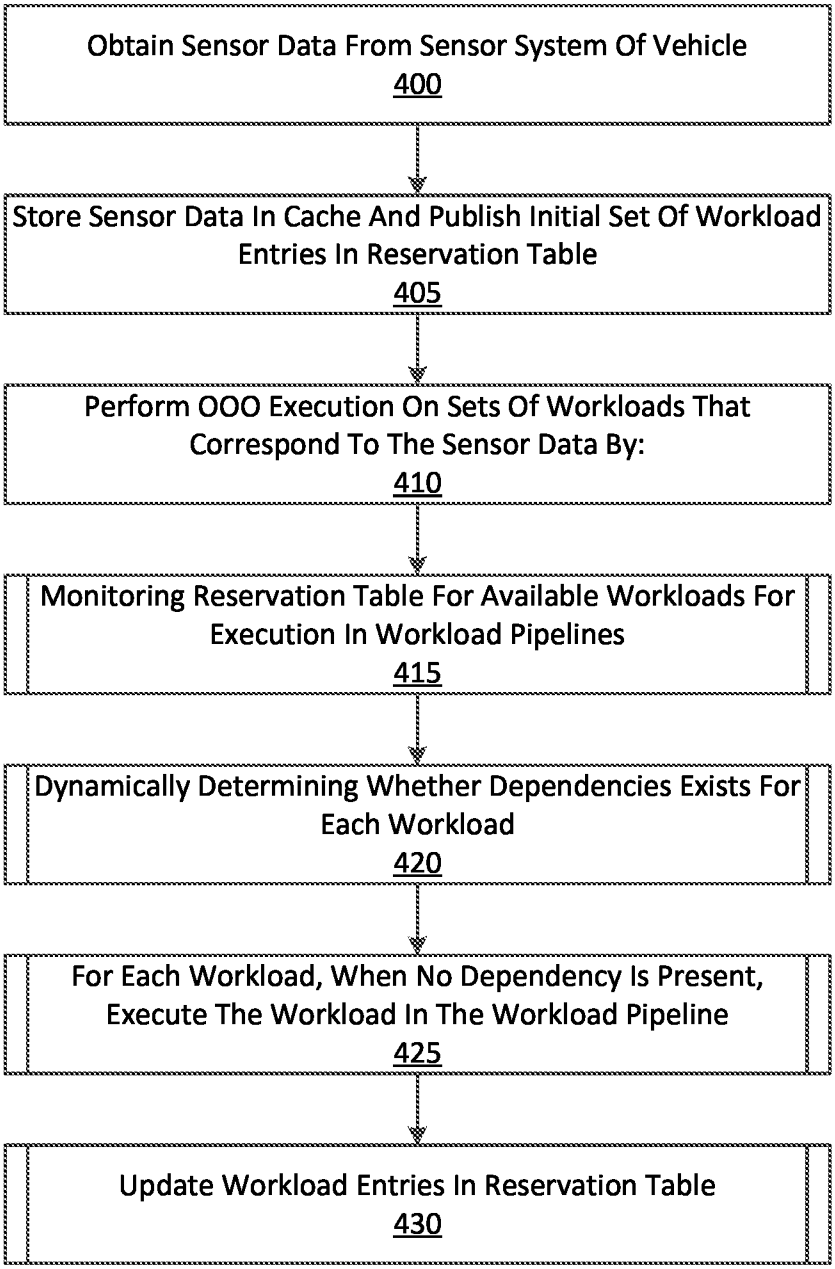
FIG. 4 is a flow chart describing a method of implementing out-of-order workload execution, according to examples described herein.

FIG. 4 is a flow chart describing a method of implementing out-of-order workload execution, according to examples described herein. In the below discussion of the methods of FIG. 4, reference may be made to reference characters representing certain features described with respect to the system diagrams of FIGS. 1 through 3. Furthermore, the steps described with respect to the flow chart of FIG. 4 may be performed by the computing system 100 and/or system-on-chip 200 as shown and described with respect to FIGS. 1 through 3. Further still, certain steps described with respect to the flow chart of FIG. 4 may be performed prior to, in conjunction with, or subsequent to any other step, and need not be performed in the respective sequences shown.

Referring to FIG. 4, at block 400, the computing system 100 can obtain sensor data from a sensor system of a vehicle. As described herein, the sensor system can comprise a set of vehicle sensors 205, such as image sensors, LIDAR sensors, radar sensors, ultrasonic sensors, microphones, and the like. As further provided herein, the computing system 100 can comprise a system-on-chip 200 that includes a sensor data input chiplet 210 that obtains the sensor data from the vehicle's sensor system. At block 405, the computing system 100 can store the sensor data in a cache 225 and publish an initial set of workload entries in a reservation table 350.

In particular, the sensor data input chiplet 210 can obtain and store the sensor data in the cache 225 and for each item of sensor data (e.g., individual images, point clouds, etc.), the sensor data input chiplet 210 can generate a workload entry in the reservation table 350. The workload entry can provide a description of the sensor data item (e.g., an acquired time and source of the sensor data item, such as a specified camera). In further examples, the workload entry can indicate the location or address of the sensor data item in the cache 225. As described throughout the present disclosure, at block 410, one or more chiplets of the computing system 100 can perform out-of-order execution on workloads corresponding to the workload entries in the reservation table 350. In particular, one or more CPUs of the central chiplet 220, the general compute chiplets 245, the ML accelerator chiplet 250, and/or the autonomous drive chiplet 240 can perform out-of-order execution on the workloads in the manner described herein.

At block 415, the central chiplet 300 and/or workload processing chiplets 320 of the computing system 100 can perform out-of-order execution of workloads by monitoring the reservation table 350 for available workloads for execution in workload pipelines. As provided herein, an initial set of workloads to be performed on the obtained sensor data by the sensor data input chiplet 310 may not have dependencies. As further provided herein, subsequent workloads can have a set of dependencies which can be indicated in their workload entries in the reservation table 350. For example, the central chiplet 300 and/or workload processing chiplets 320 can execute workloads and dynamically update the dependency information in the workload entries of the reservation table 350 accordingly.

At block 420, the chiplet(s) of the computing system 100 can dynamically determine, based on monitoring the reservation table 350, whether one or more dependencies exist for each workload. For example, workload entries in the reservation table 350 can be updated (e.g., renamed) dynamically as workloads are completed, which can indicate whether the workloads are ready for execution. In further examples, the chiplet(s) can monitor a workload window 355 of the reservation table 350 (e.g., via an instruction pointer) by dynamically scrolling through each entry to determine whether respective workloads are ready for execution. At block 425, the chiplet(s) can execute workloads corresponding to entries that are ready for execution (e.g., those having no dependencies), and then update the dependency information for entries in the workload window 355 accordingly. As such, the reservation table 350 can operate as an out-of-order buffer such that the workloads are executed by the chiplet(s) in an out-of-order manner (e.g., as opposed to natural order processing).

In various implementations, each chiplet of the SoC arrangement executes the workloads in respective workload pipelines in accordance with a program. In the context of autonomous driving, the central chiplet 300 and/or workload processing chiplets 320 (e.g., the autonomous drive chiplet 240, general compute chiplets 245, and/or ML accelerator chiplet 250) can execute workloads in accordance with the reflex program 330, which causes the chiplet(s) to execute the workloads deterministically to facilitate the verification and certification of the autonomous driving system (e.g., by safety authorities). In particular, each deterministic pipeline includes repeatedly executed workloads, such that the outputs of the pipelines can be continuously compared (e.g., by a functional safety component of the central chiplet 300) and verified. As such, any faults or errors can be readily detected and/or contained. Furthermore, by storing information corresponding to the execution of the workloads in high-bandwidth memory chiplets (e.g., HBM-RAM 255 and HBM-RAM 235 shown in FIG. 2), any detected errors or faults can be traced back to a particular source. As provided herein, the out-of-order execution of workloads for autonomous driving purposes can increase the speed of workload execution by utilizing chiplet resources in a continuous manner, as opposed to the chiplets stalling or awaiting sequential workloads to become available before their execution.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature.

What is claimed is:

1. A computing system for operating a vehicle, the computing system comprising:

a sensor data input chiplet to continuously (i) obtain sensor data from a sensor system of the vehicle when the vehicle is being operated, (ii) store the sensor data in a cache; and a reservation table that includes a reference for each workload of a plurality of workloads, the reference for each workload identifying corresponding sensor data in the cache and dependency information for each workload;

one or more workload processing chiplets to execute a plurality of workloads, corresponding to driving tasks of the vehicle, using corresponding sensor data stored in the cache, the one or more workload processing chiplets to perform out-of-order execution on at least some of the plurality of workloads, by:

continuously monitoring the reservation table to determine available workloads that are ready for execution, each available workload referencing dependency information that indicates the workload has no unresolved dependency;

upon determining each available workload, executing the workload using the corresponding sensor data that is referenced for the workload; and for workloads that, based on their dependency information referenced by the reservation table, are determined to not be ready for execution, buffering each of the respective workloads until the workload is determined to be ready for execution, then executing the respective workload using the corresponding sensor data that is referenced for the workload.

2. The computing system of claim 1, wherein the sensor data input chiplet further generates a plurality of workload entries for the plurality of workloads, the plurality of workload entries being included in the reservation table, each workload entry referencing corresponding sensor data in the cache and dependency information for the respective workload.

3. The computing system of claim 2, wherein upon executing individual workloads of the plurality of workloads, the one or more workload processing chiplets update, in the reservation table, dependency information referenced by workload entries of other workloads that have a dependency on the executed workload.

4. The computing system of claim 2, wherein the sensor data input chiplet generates a workload entry for each item of the sensor data stored in the cache, and references the workload entry for each item of the sensor data in the reservation table.

5. The computing system of claim 2, wherein the one or more workload processing chiplets monitor the reservation table to dynamically determine whether the dependency information referenced with each workload entry identifies any unresolved dependencies.

6. The computing system of claim 5, wherein the one or more workload processing chiplets monitor a workload window of the reservation table to determine a sequence of workload entries for available workloads using an instruction pointer, and for each workload that is determined to not be ready for execution, the one or more workload processing chiplets identify a next workload entry of the sequence to determine whether the next workload entry is ready for execution.

7. The computing system of claim 1, wherein the computing system is included on an autonomous vehicle, and wherein the sensor system comprises a sensor system of the autonomous vehicle.

8. The computing system of claim 7, wherein the sensor system comprises any combination of LIDAR sensors, image sensors, radar sensors, and ultrasonic sensors.

9. The computing system of claim 7, wherein the corresponding driving tasks of the vehicle include a plurality of the following: image stitching tasks, sensor fusion tasks, machine learning inference tasks, object detection tasks, object classification tasks, scene understanding tasks, right-of-way determination tasks, motion planning tasks, or autonomous vehicle control tasks.

10. A non-transitory computer readable medium storing instructions that, when executed by one or more processors of a computing system for operating a vehicle, cause the computing system to:

on a sensor data input chiplet of the computing system, continuously (i) obtain sensor data from a sensor system, and (ii) store the sensor data in a cache;

implement a reservation table that includes a reference for each workload of a plurality of workloads, the reference for each workload identifying corresponding sensor data in the cache and dependency information for each workload;

on one or more workload processing chiplets of the computing system, execute a plurality of workloads, corresponding to driving tasks of the vehicle, using corresponding sensor data stored in the cache, the one or more workload processing chiplets to perform out-of-order execution on at least some of the plurality of workloads, by:

continuously monitoring the reservation table to determine available workloads that are ready for execution, each available workload referencing dependency information that indicates the workload has no unresolved dependency;

upon determining each available workload, executing the workload using the corresponding sensor data that is referenced for the workload; and for workloads that, based on their dependency information referenced by the reservation table, are determined to not be ready for execution, buffering each of the respective workloads until the workload is determined to be ready for execution, then executing the respective workload using the corresponding sensor data that is referenced for the workload.

11. The non-transitory computer readable medium of claim 10, wherein the sensor data input chiplet further generates a plurality of workload entries for the plurality of workloads, the plurality of workload entries being included in the reservation table, each workload entry referencing corresponding sensor data in the cache and dependency information for the respective workload.

12. The non-transitory computer readable medium of claim 11, wherein upon executing individual workloads of the plurality of workloads, the one or more workload processing chiplets update, in the reservation table, dependency information referenced by workload entries of other workloads that have a dependency on the executed workload.

13. The non-transitory computer readable medium of claim 11, wherein the sensor data input chiplet generates a workload entry for each item of the sensor data stored in the cache, and references the workload entry for each item of the sensor data in the reservation table.

14. The non-transitory computer readable medium of claim 11, wherein the one or more workload processing chiplets monitor the reservation table to dynamically determine whether the dependency information referenced with each workload entry identifies any unresolved dependencies.

15. The non-transitory computer readable medium of claim 14, wherein the one or more workload processing chiplets monitor a workload window of the reservation table for to determine a sequence of workload entries for available workloads using an instruction pointer, and for each workload that is determined to not be ready for execution, the one or more workload processing chiplets identify a next workload entry of the sequence to determine whether the next workload entry is ready for execution.

16. The non-transitory computer readable medium of claim 10, wherein the computing system is included on an autonomous vehicle, and wherein the sensor system comprises a sensor system of the autonomous vehicle.

17. The non-transitory computer readable medium of claim 16, wherein the sensor system comprises any combination of LIDAR sensors, image sensors, radar sensors, and ultrasonic sensors.

18. The non-transitory computer readable medium of claim 16, wherein the corresponding driving tasks of the vehicle include a plurality of the following: image stitching tasks, sensor fusion tasks, machine learning inference tasks, object detection tasks, object classification tasks, scene understanding tasks, right-of-way determination tasks, motion planning tasks, or autonomous vehicle control tasks.

19. A computer-implemented method for operating a vehicle, the method being performed by one or more processors of a computing system and comprising:

continuously (i) obtaining sensor data from a sensor system, and (ii) storing the sensor data in a cache;

executing a plurality of workloads, corresponding to driving tasks of the vehicle, using corresponding sensor data stored in the cache, including performing out-of-order execution on at least some of the plurality of workloads, by:

continuously monitoring a reservation table to determine available workloads that are ready for execution, each available workload referencing, in the reservation table, dependency information that indicates the workload has no unresolved dependency;

upon determining each available workload, executing the workload using the corresponding sensor data that is referenced in the reservation table for the workload; and wherein for workloads that, based on their dependency information referenced by the reservation table, are determined to not be ready for execution, performing out-of-order execution on at least some of the plurality of workloads further comprises buffering each of the respective workloads until the workload is determined to be ready for execution, then executing the respective workload using the corresponding sensor data that is referenced for the workload in the reservation table.

20. The method of claim 19, wherein the method further comprises generating a plurality of workload entries for the plurality of workloads, the plurality of workload entries being included in the reservation table, each workload entry referencing corresponding sensor data in the cache and dependency information for the respective workload.

* * * * *